(12) United States Patent
Scharp et al.

(10) Patent No.: US 7,464,684 B2
(45) Date of Patent: Dec. 16, 2008

(54) COMPOSITE PISTON FOR AN INTERNAL COMBUSTION ENGINE

(75) Inventors: Rainer Scharp, Vaihingen (DE); Peter Kemnitz, Leutenbach (DE)

(73) Assignee: Mahle GmbH, Stuttgart (DE)

( * ) Notice: Subject to any disclaimer, the term of this patent is extended or adjusted under 35 U.S.C. 154(b) by 57 days.

(21) Appl. No.: 11/629,969

(22) PCT Filed: Jun. 17, 2005

(86) PCT No.: PCT/DE2005/001092

§ 371 (c)(1),
(2), (4) Date: Feb. 20, 2007

(87) PCT Pub. No.: WO2005/124136

PCT Pub. Date: Dec. 29, 2005

(65) Prior Publication Data

US 2008/0011262 A1    Jan. 17, 2008

(30) Foreign Application Priority Data

Jun. 19, 2004    (DE)    ......... 10 2004 029 877

(51) Int. Cl.
*F02F 3/00*    (2006.01)
(52) U.S. Cl. .................. 123/193.6; 123/193.1
(58) Field of Classification Search ........... 123/193.1, 123/193.6, 193.4
See application file for complete search history.

(56) References Cited

U.S. PATENT DOCUMENTS 4,375,782 A    3/1983    Schieber
5,363,822 A *  11/1994   Tuohy .................. 123/193.6

FOREIGN PATENT DOCUMENTS

| DE | 733 931 | 4/1943 |
| DE | 99 418 | 8/1973 |
| DE | 22 12 922 A1 | 9/1973 |
| DE | 28 21 506 | 11/1979 |
| DE | 32 49 290 | 1/1984 |
| WO | WO 81/00740 | 3/1981 |
| WO | WO 94/28297 | 12/1994 |
| WO | WO 00/53913 | 9/2000 |

OTHER PUBLICATIONS

International Search Report.

* cited by examiner

*Primary Examiner*—Noah Kamen
(74) *Attorney, Agent, or Firm*—Collard & Roe, P.C.

(57) ABSTRACT

The invention relates to an assembled piston (1) for an internal combustion engine, said piston consisting of an upper part (4) and a lower part (5) that are interconnected by means of an internal hexagon screw (6) consisting of an upper half(37) and a lower half (38). The upper half (37) of the internal hexagon screw (6) comprises an external thread (39) which is parallel to the external thread (40) of the lower screw half (38) and has a larger lead angle than the same (40). The lead angle resulting from the difference between the lead angles of the two external threads (39, 40) is very small and contributes to a high strength of the screw connection.

2 Claims, 1 Drawing Sheet

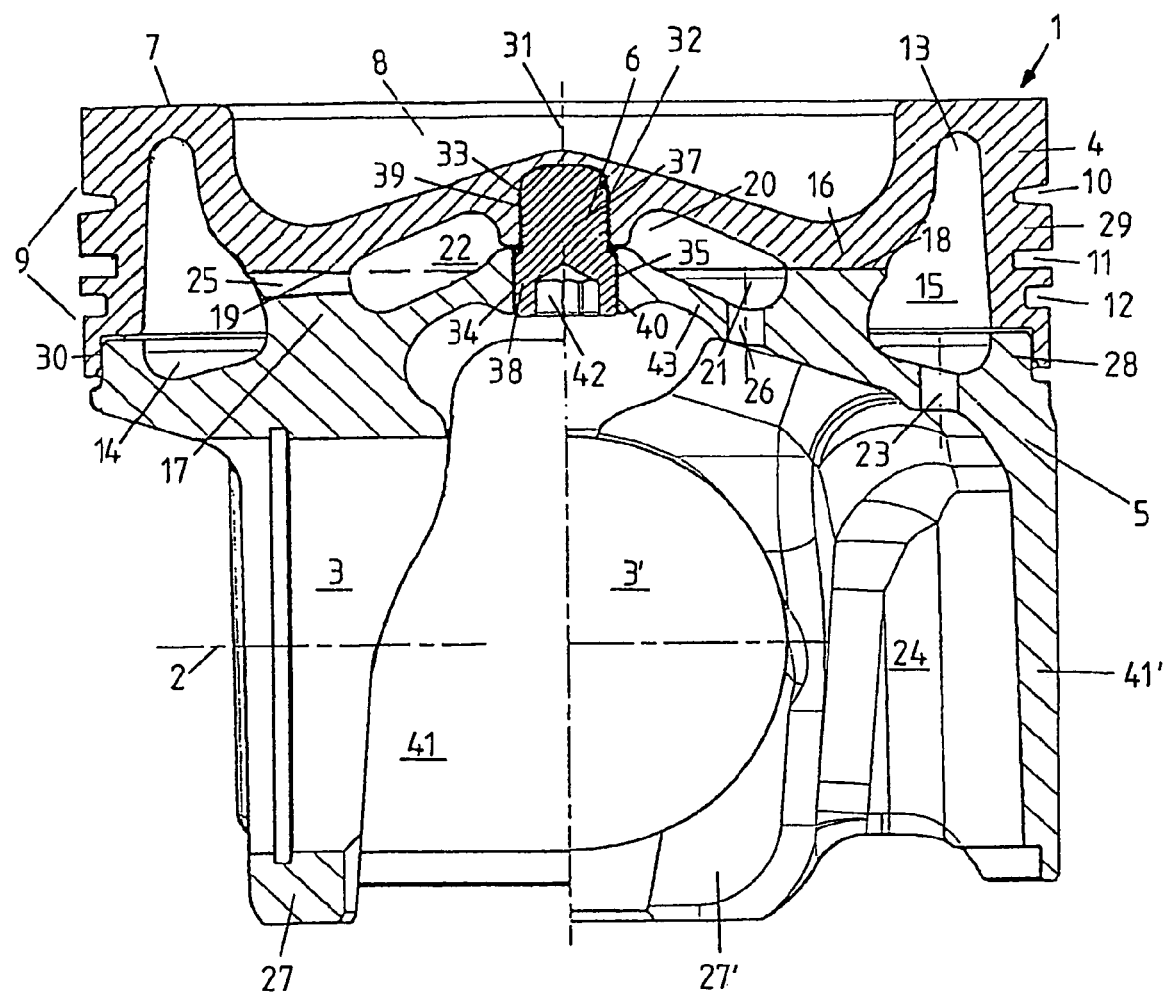

COMPOSITE PISTON FOR AN INTERNAL COMBUSTION ENGINE

CROSS REFERENCE TO RELATED APPLICATIONS

Applicants claim priority under 35 U.S.C. §119 of German Application No. 10 2004 029 877.7 filed Jun. 19, 2004. Applicants also claim priority under 35 U.S.C. §365 of PCT/DE2005/001092 filed Jun. 17, 2005. The international application under PCT article 21(2) was not published in English.

BACKGROUND OF THE INVENTION

The invention relates to a composite piston for an internal combustion engine, in accordance with the preamble of claim 1.

A composite piston that consists of an upper part and a lower part is known from the German Auslegeschrift [version of patent application published for public scrutiny before issuance] 22 12 922. The two piston parts are connected with one another by means of a hexagonal socket screw, which consists of a pin head and a pin shaft, whereby the pin head has an outside thread that runs opposite to the pin shaft. Since the strength of a screw connection is generally all the stronger the lower the pitch angle of the screw thread, and the pitch angle, which is the deciding factor in this regard, results from the sum of the pitch angles of the two outside threads that run in opposite directions, this screw connection has a very low strength.

SUMMARY OF INVENTION

It is the task of the present invention to avoid this disadvantage of the state of the art, i.e. to create a permanent, strong screw connection between the upper part and the lower part of a composite piston.

This task is accomplished with the characteristics contained in the characterizing part of the main claim, whereby a hexagonal socket screw having a thread consisting of two halves is used, which are configured to run opposite one another and have different pitch angles, so that the pitch angle that is the decisive factor for the strength of the screw connection here can be calculated from the difference of the pitch angles of the two thread halves, which is very slight, so that this results in a relatively great strength of the screw connection.

A practical embodiment of the invention is the object of the dependent claim, whereby a region around a passage bore, having a thread, is configured to have such a thin wall that it is elastic in the manner of a disk spring, and deforms when the hexagonal socket screw is screwed into the passage bore, to such an extent that a bias that increases the strength of the screw connection is exerted on the latter in this way.

BRIEF DESCRIPTION OF THE DRAWING

An exemplary embodiment of the invention will be described below, using a drawing. This shows a composite piston consisting of an upper part and a lower part, in a sectional diagram consisting of two halves, which shows two longitudinal sections of the piston, offset by 90°.

DETAILED DESCRIPTION OF THE PREFERRED EMBODIMENTS

The FIGURE shows a composite piston 1 in a sectional diagram, the left half of which shows a section through the piston 1 along a longitudinal axis 2 of a pin bore 3, and the right half of which shows a section through the piston 1 offset by 90° relative to the former. The piston 1 consists of an upper part 4 and a lower part 5, which are connected with one another by means of a hexagonal socket screw 6 disposed in the center, in such a manner that the hexagonal socket 42 of the hexagonal socket screw 6 comes to lie on the piston inside.

The upper part 4 and the lower part 5 of the piston 1 are preferably produced from forged steel. It is also possible, however, to produce the upper part 4 from steel and the lower part 5 from aluminum, or to produce the upper part 4 from forged aluminum and the lower part from cast aluminum.

The cylindrically shaped upper part 4 forms the piston crown 7, into which a combustion bowl 8 having rotation symmetry is worked. The mantle surface of the upper part 4, which lies radially on the outside, is configured as a ring belt 9 that has three ring grooves 10, 11, and 12 for accommodating piston rings, not shown in the FIGURE. The underside of the upper part 4, facing away from the piston crown 7, has a circumferential recess 13 radially on the outside, which forms a ring-shaped, outer cooling channel 15, together with a corresponding recess 14 of the lower part 5, on the piston crown side, which channel is delimited radially on the outside by a ring wall 29 formed onto the piston crown 7.

Radially on the inside, the outer cooling channel 15 is delimited partly by a ring flange 16 disposed on the underside of the upper part 4, and partly by a ring rib 17 disposed on the top of the lower part 5, whereby the upper part 4 and the lower part 5 of the piston 1 rest on one another by way of the ring flange 16 and the ring rib 17. In this connection, the ring flange 16 has a first contact surface 18 and the ring rib 17 has a second contact surface 19, by way of which contact surfaces 18, 19 of the ring flange 16 and the ring rib 17 stand in contact with one another.

Radially within the ring flange 16, the upper part 4 is provided, on its underside, with another circumferential recess 20, which forms an inner, ring-shaped cooling channel 22 together with a corresponding other recess 21 formed into the top of the lower part 5. In this connection, the outer cooling channel 15 is connected with the piston interior 24 by way of an oil run-in opening 23, and with the inner cooling channel 22 by way of an oil channel 25. The inner cooling channel 22 is connected with the piston interior 24 by way of an oil run-off opening 26. To cool the piston 1, oil is injected into the outer cooling channel 15 by way of an oil run-in opening not shown in the FIGURE; after some time, it gets into the inner cooling channel 22 by way of the oil channel 25, and runs back into the piston interior 24 by way of the oil run-off openings 23 and 26.

The lower part 5 of the piston 1 consists of two pin bosses 27, 27' that lie opposite one another and are trapezoid in section, each having a pin bore 3, 3', respectively, which are disposed at such a distance from one another that the upper part of a piston rod (not shown in the FIGURE) finds room between them. Furthermore, the lower part 5 has skirt elements 41, 41' that connect the pin bosses 27, 27' with one another. On the piston crown side, the lower part 5 has a circumferential collar 28, rectangular in section, radially on the outside, which collar fits into a recess 30 disposed radially on the inside in a face of the ring wall 29 that faces away from the piston crown, so that during assembly of the piston 1, the lower part 5 is guided by way of the collar 28 and the recess 30, and centered relative to the upper part 4.

On the surface of the lower part 5 on the piston crown side, the recess 14 follows the collar 28, radially on the inside, which recess forms the outer cooling channel 15 together with the recess 13 of the upper part 4, followed by the ring rib 17 and the other recess 21, which forms the inner cooling channel 22 together with the other recess 20 of the upper part 4. In this connection, the recess 21 is worked so far into the lower piston part 5 that a thin-walled region 43 is formed between piston interior 24 and recess 21, which region is configured elastically, in the manner of a disk spring.

Coaxial to the axis 31 of the piston 1, a dead-end bore 32 with inside thread 33 is worked into the underside of the piston crown 7, and a passage bore 34 with a thread 35 that runs in the same direction as the inside thread 33 is worked into the top of the lower part 5, i.e. into the elastically resilient region 43, whereby the pitch angle of the inside thread 33 is greater than the pitch angle of the thread 35. Furthermore, the inside diameter of the dead-end bore 32 is ½ mm to 1 mm smaller than the inside diameter of the passage bore 34.

Using the hexagonal socket screw 6 consisting of an upper half 37 and a lower half 38, the upper part 4 is screwed together with the lower part 5, whereby the upper screw half 37 has such a diameter and such an outside thread 39 that it can be screwed into the dead-end bore 32, and the lower screw half 38 has such a diameter and such an outside thread that it can be screwed into the passage bore 34. Accordingly, the diameter of the upper screw half 37 is ½ mm to 1 mm smaller than that of the lower screw half 38, and the outside thread 39 of the upper screw half 37 has a greater pitch angle than that of the lower screw half 38.

When the upper part 4 is screwed together with the lower part 5 of the piston 1, the hexagonal socket screw 6 is first screwed into the passage bore 34, by way of the outside thread 40 of its lower half 38, from below, to such an extent that the upper half 37 of the hexagonal socket screw 6 projects out of the passage bore 34. Subsequently, the upper part 4 is set onto the lower part 5 in such a manner that the upper and lower part of the piston 1 are disposed in a certain position relative to one another, and that the outside thread 39 of the upper half 37 of the hexagonal socket screw 6 comes into contact with and touches the dead-end bore 32 of the upper part 4. A further rotation of the hexagonal socket screw 6 has the result, because of the greater pitch angle of the outside thread 39 of the upper half 37 of the screw 6, as compared with the pitch angle of the outside thread 40 of the lower half 38 of the screw 6, that the first contact surface 19 of the upper part 4 makes contact with the second contact surface 18 of the lower part 5 sooner than the outside thread 40 of the lower half 38 of the screw 6 is completely screwed into the thread 35 of the passage bore 34.

In this connection, the upper and lower part of the piston 1 are configured in such a manner, in the region close to the bores 32 and 34, that a gap occurs here between upper and lower part, without any screw forcing. If the torque exerted on the screw 6 while the upper and lower part are being screwed together is increased after the surfaces 18 and 19 have entered into contact with one another, this results in a deformation of the region 43 in the manner of a disk spring, leading to a reduction in size of the gap between piston upper part and piston lower part, and to a bias exerted on the screw connection by the deformed region 43, which results in an increase in strength of the screw connection according to the invention.

A further increase in the strength of the screw connection results from the fact that the self-locking of a screw that prevents loosening of a screw connection is all the greater the lower the pitch angle of the screw thread. The pitch angle that is the deciding factor in the case of the screw connection according to the invention can be calculated from the difference of the pitch angles between the inside thread 33 of the dead-end bore 32 and the thread 35 of the passage bore 34, or between the outside thread 39 of the upper half 37 and the outside thread 40 of the lower half 38 of the hexagonal socket screw 6, respectively. This difference is very slight, which brings about the further improvement in the strength of the screw connection according to the invention.

REFERENCE SYMBOL LIST 1 piston
2 longitudinal axis
3, 3' pin bore
4 upper part
5 lower part
6 hexagonal socket screw
7 piston crown
8 combustion bowl
9 ring belt
10, 11, 12 ring groove
13, 14 recess
15 outer cooling channel
16 ring flange
17 ring rib
18 first contact surface
19 second contact surface
20, 21 recess
22 inner cooling channel
23 oil run-off opening
24 piston interior
25 oil channel
26 oil run-off opening
27, 27' pin boss
28 collar
29 ring wall
30 recess
31 longitudinal axis of the piston 1
32 dead-end bore
33 inside thread of the dead-end bore 32
34 passage bore
35 thread of the passage bore 34
37 upper half of the hexagonal socket screw 6
38 lower half of the hexagonal socket screw 6
39 outside thread of the upper half 37 of the hexagonal socket screw 6
40 outside thread of the lower half 38 of the hexagonal socket screw 6
41, 41' skirt element
42 hexagonal socket
43 region in the manner of a disk spring between the other recess 21 and the piston interior 24

The invention claimed is:

1. A composite piston for an internal combustion engine, comprising:
   an upper part that forms a piston crown, said upper part having a recess disposed on an underside facing away from the piston crown, said recess being circumferential with rotation symmetry relative to a longitudinal piston axis, and having a dead-end bore with an inside thread disposed on the underside and coaxial to the longitudinal piston axis; and
   a lower part comprising:
      two pin bosses disposed on an underside at a distance from one another, each pin boss having a pin bore;

skirt elements that connect the pin bosses with one another;

a recess disposed on a top and circumferential with rotation symmetry relative to the longitudinal piston axis, said recess forming an inner cooling channel together with the recess of the upper part; and a passage bore with an inside thread disposed on the top and coaxial to the longitudinal piston axis; and a hexagonal socket screw connecting the upper part and lower part, said hexagonal socket screw comprising an upper half and a lower half, each having an outside thread configured in such a manner that the outside thread of the upper screw half can be screwed into the dead-end bore and the outside thread of the lower screw half can be screwed into the passage bore, wherein a diameter of the outside thread of the upper screw half is smaller than a diameter of the outside thread of the lower screw half, such that the upper screw half can be pushed through the passage bore without hindrance, wherein the outside thread of the upper screw half is configured to run in the same direction with the outside thread of the lower screw half, and wherein the outside thread of the upper screw half has a greater pitch angle than the outside thread of the lower screw half and the inside thread of the dead-end bore has a greater pitch angle than the inside thread of the passage bore.

2. The composite piston according to claim 1, wherein the lower piston part in a region of the recess is configured to have a wall section that is elastically resilient in the manner of a disk spring.

* * * * *